(12) United States Patent
Filiatrault et al.

(10) Patent No.: US 8,128,105 B2
(45) Date of Patent: Mar. 6, 2012

(54) VIBRATORY RAMMER TRANSPORT WHEEL ASSEMBLY

(75) Inventors: Denis Filiatrault, St-Polycarpe (CA); Sylvain Theroux, St-Polycarpe (CA)

(73) Assignee: 3980367 Canada Inc., St-Polycarpe (CA)

( * ) Notice: Subject to any disclaimer, the term of this patent is extended or adjusted under 35 U.S.C. 154(b) by 1233 days.

(21) Appl. No.: 11/815,758

(22) PCT Filed: Feb. 7, 2006

(86) PCT No.: PCT/CA2006/000171
§ 371 (c)(1),
(2), (4) Date: Aug. 7, 2007

(87) PCT Pub. No.: WO2006/081690
PCT Pub. Date: Aug. 10, 2006

(65) Prior Publication Data
US 2010/0084832 A1    Apr. 8, 2010

Related U.S. Application Data

(60) Provisional application No. 60/650,177, filed on Feb. 7, 2005.

(30) Foreign Application Priority Data

May 16, 2005   (CA) ..................................... 2507397

(51) Int. Cl.
*B62B 1/10*   (2006.01)

(52) U.S. Cl. .............. 280/47.15; 280/47.131; 280/47.24

(58) Field of Classification Search ............. 280/DIG. 2, 280/43, 63, 64, 47.15, 47.17, 47.21, 47.24, 280/47.26, 47.131, 79.11, 79.2, 79.5–79.7
See application file for complete search history.

(56) References Cited

U.S. PATENT DOCUMENTS

| 426,474 A | * | 4/1890 | Sosalla ............................ 280/35 |
| 2,644,379 A | | 7/1953 | Lowe |
| 2,659,583 A | | 11/1953 | Dorkins |

(Continued)

FOREIGN PATENT DOCUMENTS

CA   1086121 A1   9/1980

(Continued)

OTHER PUBLICATIONS

International Search Report from PCT/CA2006/000171, dated May 12, 2006.

*Primary Examiner* — J. Allen Shriver, II
*Assistant Examiner* — Travis Coolman
(74) *Attorney, Agent, or Firm* — Knobbe Martens Olson & Bear LLP

(57) ABSTRACT

A wheel assembly for providing wheeled transport to a compaction tool having a foot structure. The wheel assembly comprises an axle support member comprising at least one attachment means for attaching the axle support member to a top surface of the foot structure. The assembly further comprises an axle removably attached to the axle support member and having first and second opposite ends. A first wheel is mounted on the first end of the axle and a second wheel is mounted on the second end of the axle. The axle support member is fitted on a pair of pre-existing nut-bolt fasteners on the top surface of the foot structure.

12 Claims, 4 Drawing Sheets

U.S. PATENT DOCUMENTS

| | | | |
|---|---|---|---|
| 2,730,320 A | | 1/1956 | Srader |
| 2,838,320 A | * | 6/1958 | Sosalla ...................... 280/47.24 |
| 2,894,435 A | | 7/1959 | Brown |
| 3,071,387 A | * | 1/1963 | Beaman et al. ............ 280/47.24 |
| 3,119,424 A | | 1/1964 | Henry |
| 3,189,104 A | | 6/1965 | Jamer et al. |
| 3,199,424 A | | 8/1965 | Glass |
| 3,386,353 A | | 6/1968 | Wells |
| 3,416,417 A | * | 12/1968 | McIlrath et al. ................. 404/85 |
| 3,453,940 A | | 7/1969 | Berkhoudt |
| 3,673,931 A | * | 7/1972 | Dening et al. ............. 404/133.1 |
| 4,155,527 A | | 5/1979 | Sjoberg |
| 4,219,287 A | * | 8/1980 | Marks ........................... 404/117 |
| 4,367,880 A | | 1/1983 | Harding |
| 4,398,737 A | | 8/1983 | Harding |
| 4,634,311 A | | 1/1987 | Jinnings et al. |
| 4,852,661 A | | 8/1989 | Ellington |
| 5,088,799 A | * | 2/1992 | Redmon et al. .......... 301/111.05 |
| 5,232,233 A | * | 8/1993 | Jedora ...................... 280/47.331 |
| 5,236,279 A | | 8/1993 | Grinager |
| 6,059,299 A | * | 5/2000 | Rust ........................ 280/47.131 |
| 6,062,802 A | * | 5/2000 | Aenchbacher ................ 414/490 |
| 6,293,729 B1 | | 9/2001 | Greppmair |
| 6,347,907 B1 | * | 2/2002 | Halstead ......................... 404/85 |
| 6,439,317 B1 | | 8/2002 | Minotti et al. |
| 6,474,906 B1 | | 11/2002 | Cunningham et al. |
| 6,561,745 B2 | | 5/2003 | Rountree |
| 6,575,481 B1 | * | 6/2003 | Davis ......................... 280/47.17 |
| 6,837,648 B1 | | 1/2005 | Wadensten |
| 2007/0187915 A1 | * | 8/2007 | Filiatrault ................ 280/47.131 |

FOREIGN PATENT DOCUMENTS

WO WO 03/106771 A1 12/2003

* cited by examiner

US 8,128,105 B2

VIBRATORY RAMMER TRANSPORT WHEEL ASSEMBLY

RELATED APPLICATIONS

This application is a U.S. National Phase under 35 U.S.C. 371 of the International Patent Application No. PCT/CA2006/000171, filed Feb. 7, 2006 and published in English on Aug. 10, 2006 as WO 2006/081690, which claims the benefit under 35 USC §119(e) of U.S. Provisional Application No. 60/650,177, filed Feb. 7, 2005, and which claims the benefit of Canadian Patent Application No. 2,507,397, filed May 16, 2005.

FIELD OF THE INVENTION

The present invention generally relates to an apparatus used to facilitate transport of a vibratory rammer or a similar tool from one location to another. More particularly, it relates to an auxiliary wheel assembly that can be removably attached to a vibratory rammer or the like to facilitate its transport.

BACKGROUND OF THE INVENTION

Vibratory rammers (or tampers) are designed for confined area compaction of granular, mixed and cohesive soils. Applications include compaction of backfill around foundations, subgrades underneath footings, base preparation for concrete work, backfill compaction for pipeline and cable trenches as well as asphalt patching for repair work on streets and sidewalks. These machines are used predominantly for compacting and levelling soil, sand and asphalt during site, road and pavement works.

These hand held rammer machines or tamper machines (also known as jumping jacks) are used extensively by ground working gangs within the construction industry. These machines consist of a ram with heavy foot plate which is driven up and down by the engine mounted immediately above it.

Their usage can vary from a few minutes to a whole day depending on the extent of the job and the system of work adopted.

The operator usually positions and manoeuvres the rammer by use of a rectangular steel frame which is mounted on top of the engine. However, rammers are heavy and difficult to move from one location to another when the machine is not being operated. Consequently, operators attempting to move the rammer are sometimes subject to different injuries (including back injuries) when attempting to move the machine over certain distances.

U.S. Pat. No. 4,367,880 (HARDING) teaches the use of a support on rollers removably attachable to the base of certain types of heavy machinery tools to facilitate their transport. The machinery must be placed on the support and then tilted to allow displacement of the tool.

U.S. Pat. No. 3,119,424 (GLASS) discloses a roller support structure which can be installed on a bar used for manipulation and operation of the tool. To transport the tool, the tool is pivoted about the roller support structure to lift its base off the ground and its displacement.

U.S. Pat. No. 6,561,745 (ROUNTREE) describes a wheeled dolly to transport a sander with a hand-operable brake for restraining rotation of at least one of the dolly wheels.

Several other prior art documents describe various types of tool transport devices. These documents are known to the Applicant by the following patent numbers: U.S. Pat. No. 2,659,583 (E. E. DORKINS), U.S. Pat. No. 2,730,320 (S. L. SRADER), U.S. Pat. No. 3,189,104 (D. W. JAMER et al.), U.S. Pat. No. 3,386,353 (G. S. WELLS), U.S. Pat. No. 3,453,940 (J. G. BERKHOUDT), U.S. Pat. No. 4,155,527 (SJOBERG), U.S. Pat. No. 4,634,311 (JINNINGS), U.S. Pat. No. 4,852,661 (ELLINGTON), U.S. Pat. No. 5,236,279 (GRINAGER), U.S. Pat. No. 6,293,729 B1 (GREPPMAIR), U.S. Pat. No. 6,439,317 B1 (MINOTTI), U.S. Pat. No. 6,474,906 B1 (CUNNINGHAM), U.S. Pat. No. 6,837,648 B1 (WADENSTEN).

However, none of the above-mentioned prior art documents teach the use of transport device which is simple and uses existing fastening features on the tool being transported.

Thus, there is still presently a need for a device, which can be used to help facilitate the transport of a rammer from one location to another in a simple, safe and efficient manner.

SUMMARY OF THE INVENTION

An object of the present invention is to propose a device that satisfies the above-mentioned need.

According to the present invention, that object is accomplished with the development of a wheel assembly that can be removably attached to a vibratory rammer to facilitate its transport from one location to another. The assembly can help improve the efficiency, speed and safety of relocations of rammers exceeding 150 lbs over uneven, rocky or sandy terrain. The wheel assembly helps improve different safety standards related to the moving of equipment and machinery. The strength and effort required to move a rammer from one location to another is greatly reduced, hence improving the safety for an operator of the equipment.

More particularly, the present invention provides a wheel assembly for providing wheeled transport to a compaction tool having a foot structure. The wheel assembly comprises an axle support member comprising at least one attachment means for attaching the axle support member to a top surface of the foot structure. The assembly further comprises an axle removably attached to the axle support member and having first and second opposite ends; and at least two wheels, a first wheel mounted on the first end of said axle and a second wheel mounted on the second end of said axle.

In accordance with a preferred aspect, the attaching means is preferably attaching the axle support member to at least one fastener projecting on the top surface of said foot structure. It is however worth mentioning that in accordance with another preferred embodiment not illustrated, the attaching means may simply consist of the axle support member being directly attached to the top surface of the foot structure, as for example by welding the axle support member to the foot structure.

In accordance with another preferred aspect of the invention, the attachment member is fitted on a pair of pre-existing nut-bolt fasteners on the top surface of the foot structure and the compaction tool is a vibrating rammer.

A non-restrictive description of a preferred embodiment of the invention will now be given with reference to the appended drawings.

DESCRIPTION OF PREFERRED EMBODIMENTS

Figure 1:
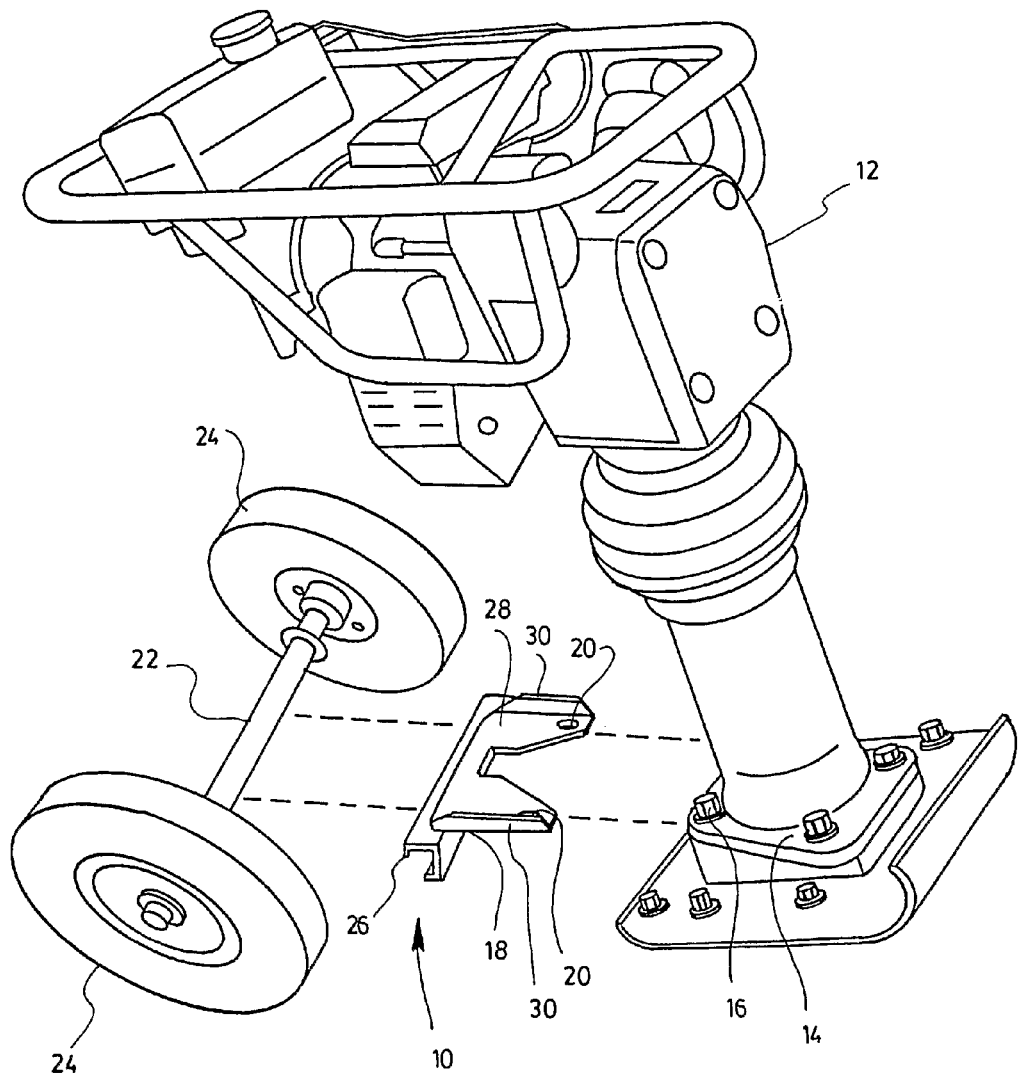
FIG. 1 is a perspective view illustrating the installation sequence of components of a wheel assembly according to the present invention on a rammer.
Figure 2:
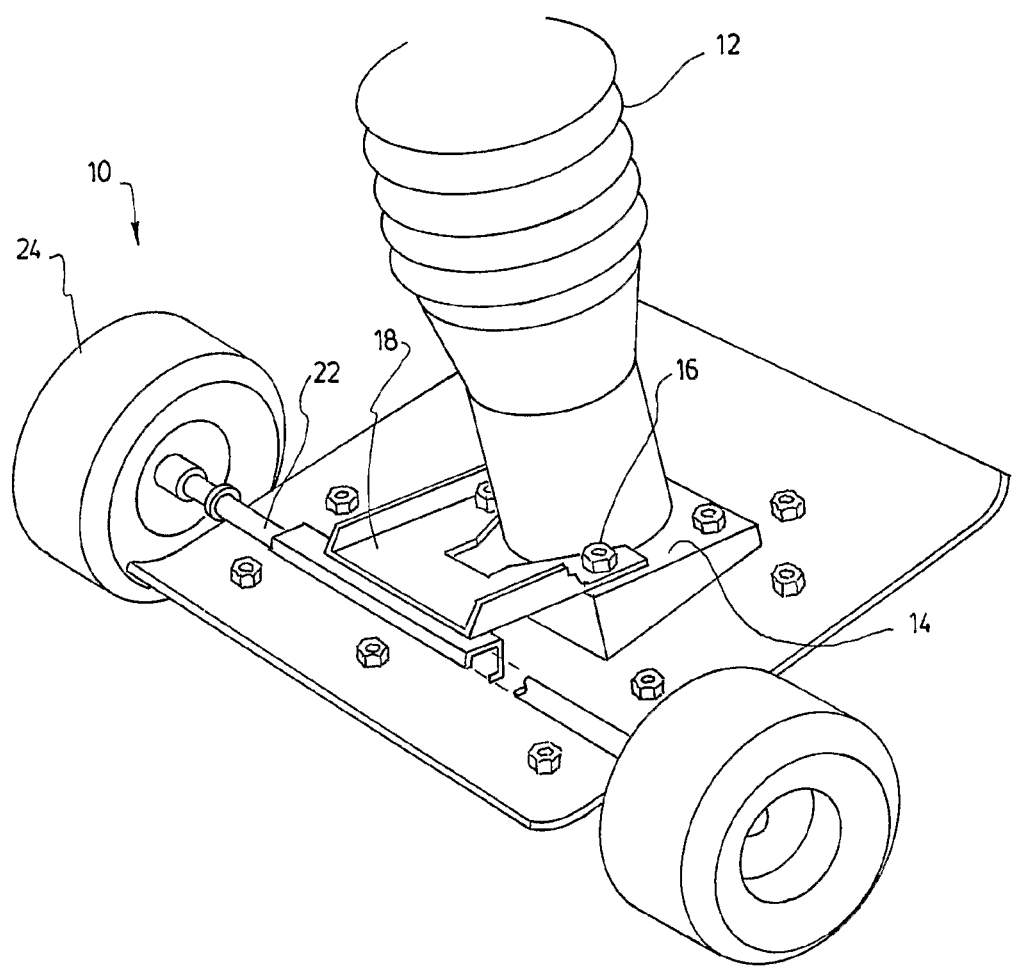
FIG. 2 is a perspective view of the wheel assembly of FIG. 1 installed on the rammer (with one wheel removed for clarity)

Referring to any one of FIG. 1 or 2, a wheel assembly 10 according to the present invention is to be fitted on a compaction tool 12, such as a vibrating rammer, for providing wheeled transport for the compaction tool 12. The compaction tool 12 has a foot structure 14 and at least one fastener 16 projecting on a top surface of the foot structure 14.

Figure 3:
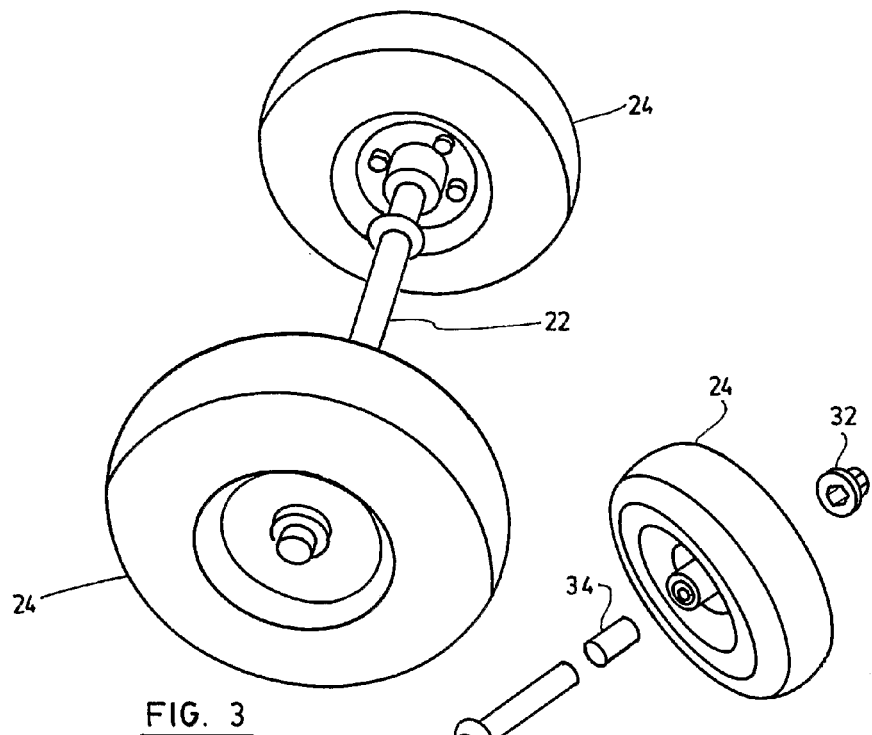
FIG. 3 is a perspective view of the axle and wheels shown in FIG. 1 separated from the axle support member.

The wheel assembly comprises an axle support member 18 comprising at least one attachment means 20 for attaching the axle support member 18 to the at least one fastener 16. The wheel assembly further comprises an axle 22 removably attached to the axle support member 18 and having first and second opposite ends. As better shown in FIG. 3, a first wheel 24 is mounted on the first end of the axle 22 and a second wheel 24 is mounted on the second end of the axle 22.

Figure 4:
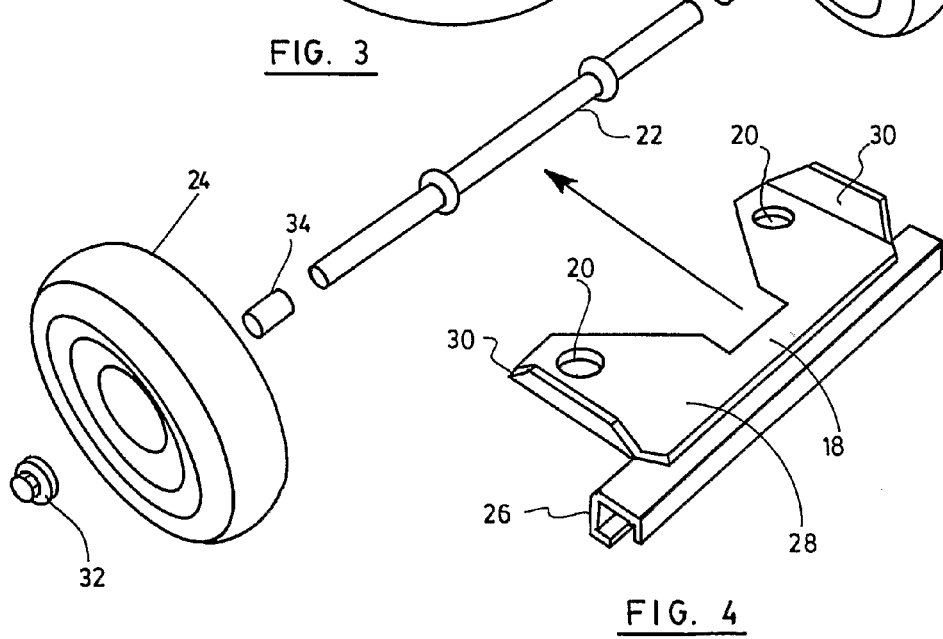
FIG. 4 is exploded view of the components of the wheel assembly according to the present invention.

As better shown in FIG. 4, preferably the axle support member 18 further comprises a pipe 26 with an inner surface and an outer surface. The pipe has an opening along a longitudinal axis thereof. The opening is sized such that the axle 22 is removably pressure-fitted against the inner surface of the pipe 26. The axle support member 18 also comprises a plate 28, which is preferably U-shaped, mounted on the outer surface of the pipe 26 connecting the pipe 16 to the compaction tool 12 through the at least one attachment means 20.

Preferably, the axle support member 18 comprises a plurality of attachment means 20, and the compaction tool 12 comprises a plurality of fasteners 16. Each of the plurality attachment means 20 is located on the plate so as to be in alignment with a corresponding one of the plurality of fasteners 16.

Preferably, the at least one attachment means 20 is a hole sized for engagement with the at least one fastener 16.

In another preferred embodiment of the invention not illustrated the plate is welded to the top surface of the foot structure and is thus an integral part of the foot structure. In such a case, the attaching means is the welding between the parts.

Preferably, as shown in FIG. 4, the pipe 26 is substantially square-shaped.

Preferably, as shown in FIG. 4, the plate 28 comprises first and second wing members 30 integral to the plate 28 and located on first and second opposite side edges of the plate 28 respectively. The wing members 30 extend in a generally transverse direction with respect to the plate 28. The wing members 30 reduce stress concentration around any holes in the plate and therefore help reduce fatigue cracking of the plate that may be initiated in proximity of the holes.

Preferably, the axle support member 18 is made of a metal selected from the group consisting of steel, aluminum, steel alloys and aluminum alloys.

The wheel assembly 10 according to the present invention can be installed manually on the rammer. Preferably, it involves the installation of a fixed piece, that is to say the plate 28 of the axle support member 18, on the base of the foot structure 14 on a rear side of the rammer, by using two existing fasteners 16, such as nuts and bolts, located on the foot structure 14. The wheel assembly 10 further comprises an axle 22 that can be removably attached to the axle support member 18, with a wheel at each extremity of the axle 22. Preferably, the wheels have 10 inch tires with air chambers and rotate with the help of ball bearings.

Preferably, the wheels are attached to the axles using caps 32.

Installation of the wheel assembly 10 is made according to the following steps:

1) Push and tilt the rammer 12 lightly frontwards;
2) Fasten the axle support member 18 to the foot structure 14 of the rammer 12;
3) Place the axle 22 within the pipe 26 of the axle support member 18;
4) Step on the foot structure 14, to latch and press fit the axle 22 onto the axle support member 18;
5) Pull and tilt the rammer backwards;
6) The rammer can now be moved with ease, minimal effort and a lower risk of injury to the operator.

Figure 5:
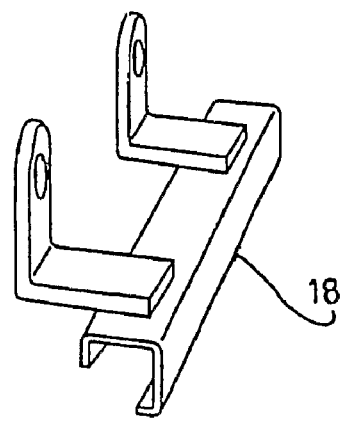
FIG. 5 is a perspective view of an axle support member according to another preferred embodiment of the present invention.
Figure 6:
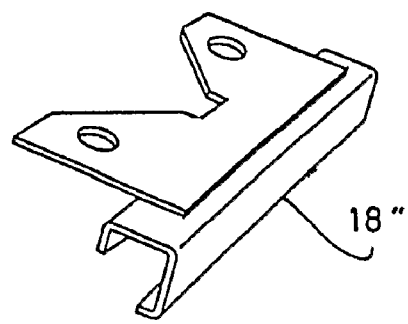
FIG. 6 is a perspective view of an axle support member according to a another preferred embodiment of the present invention.

FIGS. 5 and 6 show other preferred embodiments of the axle support member (18' and 18") comprising either a simple metallic plate or a pair of iron angles depending on the type and shape of the rammer base foot the wheel assembly is to be attached to.

The following table gives details on the components of the wheel assembly illustrated in FIG. 4.

| Item | Quantity | Identification | Dimension |
| --- | --- | --- | --- |
| 24 | 2 | Tires | 10" diameter |
| 22 | 1 | Axle | $5/8$" × $19\frac{1}{2}$" |
| 34 | 2 | Spacing tubes | $2\frac{1}{2}$" |
| 26 | 1 | Square pipe | N/A |

Although the present invention has been explained hereinabove by way of preferred embodiments thereof, it should be pointed out that any modifications to these preferred embodiments within the scope of the appended claims is not deemed to alter or change the nature and scope of the present invention.

What is claimed is:

1. A wheel assembly for providing wheeled transport to a compaction tool having a foot structure, said wheel assembly comprising:
   an axle support member comprising:
   at least one attachment member for attaching the axle support member to at least one fastener projecting on a top surface of the foot structure; and
   a tube having a longitudinal access opening, the longitudinal access opening beginning at an end face of the tube and ending at an opposite end face of the tube;
   a plate mounted on the outer surface of the tube connecting the tube to the compaction tool through the at least one attachment member;
   an axle removably attached to the axle support member and having first and second opposite ends; and
   at least two wheels, a first wheel mounted on the first end of said axle and a second wheel mounted on the second end of said axle, wherein the longitudinal access opening is sized such that the axle can be removably captured by the tube.

2. The wheel assembly according to claim 1, wherein the tube is substantially square-shaped.

3. The wheel assembly according to claim 2, wherein the plate comprises first and second wing members integral to the plate and located on first and second opposite side edges of the plate respectively, said wing members extending in a generally transverse direction with respect to the plate.

4. The wheel assembly according to claim 2, wherein the plate is substantially U-shaped.

5. The wheel assembly according to claim 1, wherein the axle support member comprises a plurality of said attachment members, the compaction tool comprises a plurality of said fasteners, and each of the plurality of attachment members is in alignment with a corresponding one of the plurality of fasteners.

6. The wheel assembly according to claim 5, wherein the tube is substantially square-shaped.

7. The wheel assembly according to claim 1, wherein the plate comprises first and second wing members integral to the plate and located on first and second opposite side edges of the plate respectively, said wing members extending in a generally transverse direction with respect to the plate.

8. The wheel assembly according to claim 7, wherein the plate is substantially U-shaped.

9. The wheel assembly according to claim 1, wherein the axle support member is made of a metal selected from the group consisting of steel, aluminum, steel alloys and aluminum alloys.

10. The wheel assembly according to claim 1, wherein the compaction tool is a vibrating rammer.

11. The wheel assembly according to claim 1, wherein the at least one attachment member is a hole sized for engagement with the at least one fastener.

12. The wheel assembly according to claim 1, wherein the plate is substantially U-shaped.

* * * * *